US006865937B2

(12) United States Patent
Lerner et al.

(10) Patent No.: US 6,865,937 B2
(45) Date of Patent: Mar. 15, 2005

(54) DEIONIZED WATER SPRAY ON LOSS OF FLUID PROCESSING TANK EXHAUST

(75) Inventors: Alexander N Lerner, San Jose, CA (US); Harshad M Borgaonkar, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 342 days.

(21) Appl. No.: 10/144,684

(22) Filed: May 13, 2002

(65) Prior Publication Data

US 2002/0187742 A1 Dec. 12, 2002

Related U.S. Application Data

(60) Provisional application No. 60/291,144, filed on May 14, 2001.

(51) Int. Cl.[7] .......... G01F 22/00

(52) U.S. Cl. .......... 73/204.18; 588/260; 134/180

(58) Field of Search .......... 73/204.18, 291, 73/292, 293, 432.1, 861, 135, 138; 588/260, 261; 134/1.3, 2, 3, 18, 56 R, 57 R; 239/1, 6, 10, 68

(56) References Cited

U.S. PATENT DOCUMENTS 4,819,483 A * 4/1989 Emplit et al. .......... 73/304 C
5,011,715 A * 4/1991 Broadbent .......... 427/443.1
5,370,743 A * 12/1994 Usui et al. .......... 134/18
5,722,441 A * 3/1998 Teramoto .......... 134/56 R
5,911,837 A * 6/1999 Matthews .......... 134/2
5,931,173 A * 8/1999 Schiele .......... 134/57 R
6,050,283 A * 4/2000 Hoffman et al. .......... 137/3
6,158,445 A * 12/2000 Olesen et al. .......... 134/1.3
6,338,671 B1 * 1/2002 Kawashima et al. .......... 451/87
6,395,101 B1 * 5/2002 Scranton et al. .......... 134/32
2001/0009652 A1 * 7/2001 Arno .......... 423/240 R

FOREIGN PATENT DOCUMENTS

EP 632795 B1 * 1/1998 .......... B01J/31/02

OTHER PUBLICATIONS

Banks, Jonathan, "Development in film cleaning technologies to provide a practical alternative to the use of chlorinated solvents".*

* cited by examiner

*Primary Examiner*—Hezron Williams
*Assistant Examiner*—David A. Rogers
(74) *Attorney, Agent, or Firm*—Dugan & Dugan

(57) ABSTRACT

Methods and apparatus are provided for increasing the safety of a clogged or failed exhaust system. In accordance with a first embodiment, an apparatus is provided that includes (1) a tank adapted to contain a processing fluid; (2) an exhaust system coupled to the tank and adapted to exhaust a gas from the tank, the gas including a hazardous vapor of the processing fluid; (3) a sensor coupled to the exhaust system and adapted to detect a rate at which gas is exhausted from the tank; and (4) a fluid supply mechanism adapted to supply a diluting fluid to the tank so as to dilute the processing fluid contained by the tank if the rate at which gas is exhausted from the tank is less than a predetermined rate. Systems, methods and computer program products are provided in accordance with this and other embodiments.

14 Claims, 1 Drawing Sheet

DEIONIZED WATER SPRAY ON LOSS OF FLUID PROCESSING TANK EXHAUST

This application claims priority from U.S. provisional application Ser. No. 60/291,144, filed May 14, 2001.

FIELD OF THE INVENTION

The present invention relates generally to apparatuses and methods for processing thin substrates such as semiconductor wafers, compact discs, glass wafers, and the like. More particularly, the present invention relates to a process that monitors and responds to the failure of a processing bath's exhaust system.

BACKGROUND OF THE INVENTION

The fabrication of semiconductor devices occurs via a plurality of processes, each of which is designed to perform a specific process on the semiconductor device. Many of these processes employ volatile solvents having a low heat of vaporization. For example, a cleaning bath may submerge substrates in a heated chemistry, the vapors of which are potentially harmful (e.g., combustible and/or harmful to humans and/or the environment). Government and/or industry often set acceptable vapor emission levels for these chemistries (e.g., low emission levels). So that the concentration of potentially harmful vapors will not exceed a recommended level, an exhaust system having a pump adapted to pump gases from the processing region is typically employed. Occasionally, however, the exhaust system may clog or may fail, causing the exhaust rate to be insufficient for maintaining the recommended level. In such circumstances, harmful vapors may accumulate. Thus, a safety hazard may result from a clogged or failed exhaust system.

SUMMARY OF THE INVENTION

Methods and apparatus are provided for increasing the safety of a clogged or failed exhaust system. In accordance with a first embodiment of the invention, an apparatus is provided that includes (1) a tank adapted to contain a processing fluid; (2) an exhaust system coupled to the tank and adapted to exhaust a gas from the tank, the gas including a hazardous vapor of the processing fluid; (3) a sensor coupled to the exhaust system and adapted to detect a rate at which gas is exhausted from the tank; and (4) a fluid supply mechanism adapted to supply a diluting fluid to the tank so as to dilute the processing fluid contained by the tank if the rate at which gas is exhausted from the tank is less than a predetermined rate.

Systems, methods and computer program products are provided in accordance with this and other embodiments of the invention. Each computer program product described herein may be carried by a medium readable by a computer (e.g., a carrier wave signal, a floppy disc, a compact disc, a DVD, a hard drive, a random access memory, etc.).

Other features and aspects of the present invention will become more fully apparent from the following detailed description, the appended claims and the accompanying drawings.

DETAILED DESCRIPTION ON THE PREFERRED EMBODIMENTS

Figure 1:
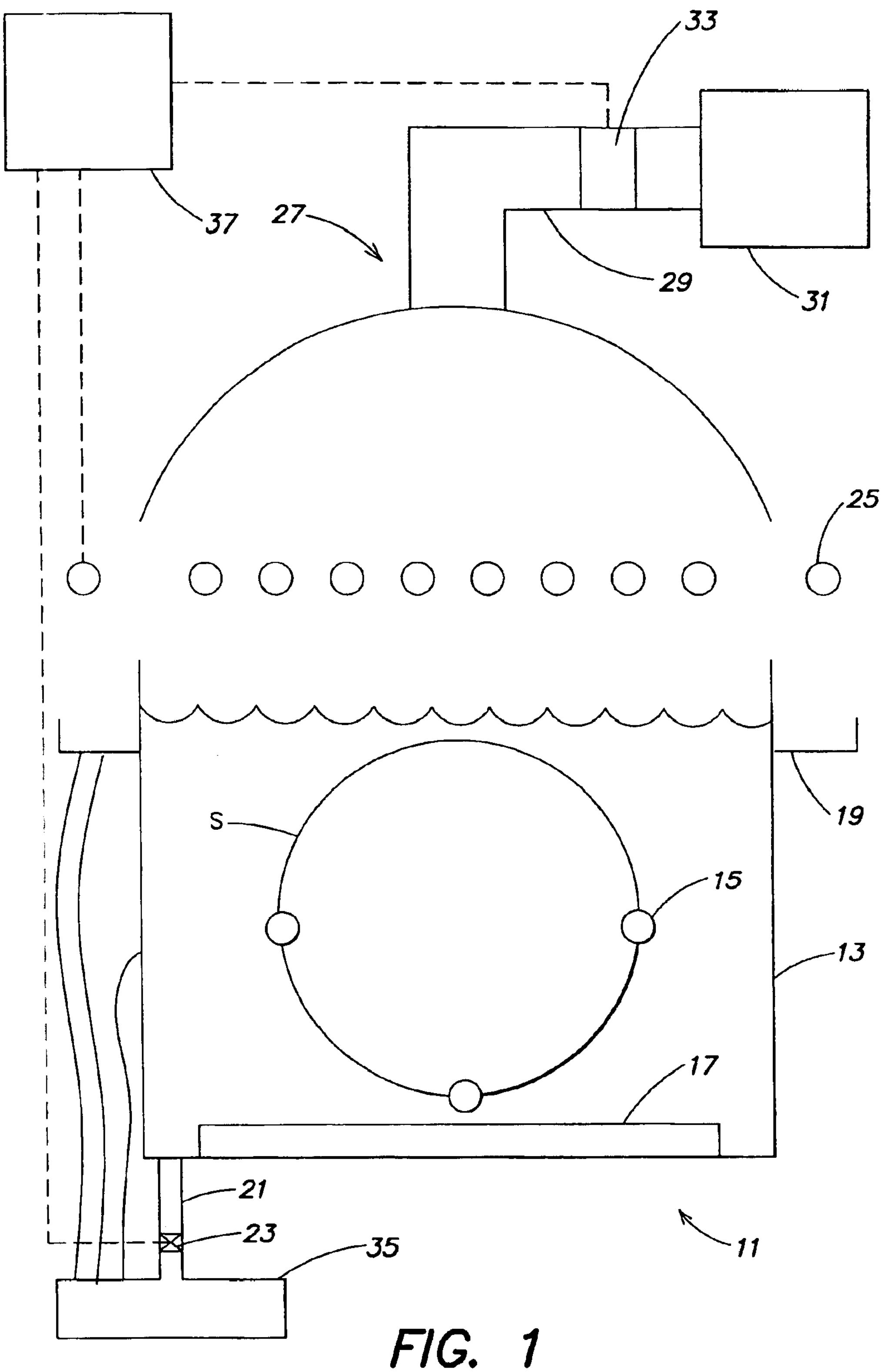
FIG. 1 is a front elevational view of an inventive substrate processing bath.

FIG. 1 is a front elevational view of an inventive processing bath 11. With reference to FIG. 1, the inventive processing bath 11 comprises a tank 13 containing a chemistry or other processing fluid that emits potentially harmful vapors. The tank 13 may be contained within a sealed chamber (e.g., that may include several processing locations such as an integrated cleaner), or may be open to the surrounding environment shared by human operators (often open processing tanks or integrated cleaners are surrounded by plastic tarps that deter vapors from entering an operator's environment). The region surrounding the tank is coupled to an exhaust mechanism configured to exhaust gas via an exhaust path. The inventive processing bath 11 further comprises a sensor located in the exhaust path and configured to detect a reduction in the desired exhaust rate required to maintain the harmful vapors at or below the recommended level. The sensor may comprise either a flow rate monitor that detects exhaust reduction when the flow rate decreases, or it may comprise a pressure sensor that detects exhaust reduction when the pressure in the exhaust path increases.

The inventive processing bath 11 also comprises a response controller that is configured to respond to the sensor by opening a drain valve to drain the tank's chemistry, and by engaging a fluid supply adapted to add a diluting fluid to the tank's chemistry. In one aspect, the fluid supply may comprise one or more nozzles configured to spray a fluid into the tank 13.

The present invention is described herein with respect to a megasonic cleaning tank that employs an ammonia containing chemistry to clean a substrate. It will be understood that the present invention may be employed with other process chambers and other chemistries.

As shown in FIG. 1, the tank 13 comprises a substrate support such as the plurality of rollers 15 for supporting and rotating a substrate to be cleaned, and a transducer 17 for imparting megasonic energy to the fluid chemistry contained within the tank 13. The tank 13 further comprises an overflow weir 19 for receiving fluid that overflows from the main body of the tank 13, as is known in the art. A drain line 21 having a valve 23 coupled thereto for controlling a fluid flow rate from the tank 13 is provided along the bottom of the tank 13. A plurality of nozzles 25 are coupled along the top of the fluid level (preferably above the fluid level) of both the main portion of the tank 13 and the overflow weir 19. Above the tank 13 is an exhaust system 27 comprising an exhaust line 29 coupled to a pump 31. A sensor 33 is coupled to the exhaust system and detects the exhaust rate of gas from the region adjacent the processing tank 13. Preferably the sensor 33 is a flow rate monitor or a pressure sensor coupled to the exhaust line 29. A fluid supply and recirculation system generally represented by reference numeral 35 may be coupled to the tank 13 and to the overflow weir 19 so as to control the concentration and temperature of the tank's chemistry as is known in the art. An exemplary fluid supply recirculation system is described in detail in U.S. patent No. 6,464,799, filed May 30, 2000 (AMAT No. 3729/CMP/RKK) the entire disclosure of which is incorporated herein by this reference.

In operation the fluid supply and recirculation system 35 maintains the desired chemistry concentration and temperature within the tank 13 as the substrate S is cleaned. The exhaust system 27 continuously pumps gas from the region of the processing tank 13 and is set to pump gas at an exhaust rate sufficient to maintain the concentration of harmful vapors at or below a recommended level. The sensor 33 is adapted to detect when the exhaust rate slows or ceases. Upon detecting such a reduction in the exhaust rate, the sensor 33 sends a signal to the controller 37 which in turn opens the drain valve 23 and begins the spray of the ionized water through the plurality of nozzles 25. The flow rate of the ionized water supplied by the nozzles 25 is less than the flow rate of chemistry from the drain line 21. Thus, deionized water is added to the chemistry in the tank 13 to dilute the chemistry's concentration as it drains from the tank. Note the deionized water is not heated, thus the deionized water also may reduce the temperature of the chemistry contained within the tank (if heated chemistry is employed) thereby reducing the evaporation rate of chemistry from the tank. By diluting the processing fluid and reducing its evaporation rate from the tank the concentration of harmful vapors may be reduced.

As is evident from the description above, the present invention may reduce the safety hazard that results from a clogged or failed exhaust system. As stated above, the present invention may be employed with other processing baths that include other volatile chemicals that produce potentially harmful vapors. The present invention may be applied to reduce the safety hazard that otherwise results as vapor, formed by evaporation of process chemicals, accumulates due to a clogged or failed exhaust mechanism.

The foregoing descriptions discloses only the preferred embodiments of the invention, modifications of the above-disclosed bath and method which fall within the scope of the invention will be readily apparent to those of ordinary skill in the art. For instance, although the present invention has been described primarily with reference to a cleaning process, the present invention may be applied to other processes. The present invention is generally directed to detecting a condition in an exhaust path and in response to detection of the condition, draining and diluting a processing chemical. The nozzles 25 may be placed in any suitable location, and the placement of the nozzles 25 in FIG. 1 is merely exemplary. Other mechanisms for supplying diluting fluid may be similarly employed.

Accordingly, while the present invention has been disclosed in connection with the preferred embodiments thereof, it should be understood that other embodiments may fall within the spirit and scope of the invention, as defined by the following claims.

What is claimed is:

1. An apparatus comprising:

a tank adapted to contain a processing fluid;

an exhaust system adapted to exhaust a gas from the tank, the gas including a hazardous vapor of the processing fluid;

a sensor coupled to the exhaust system and adapted to detect a rate at which gas is exhausted from the tank; and a fluid supply mechanism adapted to supply a diluting fluid to the tank so as to dilute the processing fluid contained by the tank if the rate at which gas is exhausted from the tank is less than a predetermined rate.

2. The apparatus of claim 1 wherein the sensor is adapted to measure a flow rate of gas in the exhaust system.

3. The apparatus of claim 1 wherein the sensor is adapted to measure a pressure of gas in the exhaust system.

4. The apparatus of claim 1 wherein the diluting fluid is a fluid adapted to cool the processing fluid.

5. The apparatus of claim 1 wherein the diluting fluid is de-ionized water.

6. The apparatus of claim 1 wherein the processing fluid includes ammonia.

7. A system comprising:

a tank adapted to contain a processing fluid;

an exhaust system adapted to exhaust a gas from the tank, the gas including a hazardous vapor of the processing fluid;

a sensor coupled to the exhaust system and adapted to detect a rate at which gas is exhausted from the tank;

a fluid supply mechanism adapted to supply a diluting fluid to the tank so as to dilute processing fluid contained by the tank; and a controller coupled to the sensor and to the fluid supply mechanism, the controller including computer program code adapted to:

employ the sensor to detect a rate at which gas is exhausted from the tank;

determine if the detected rate is below a predetermined rate; and direct the fluid supply mechanism to dilute the processing fluid with the diluting fluid if the detected rate is below the predetermined rate.

8. A method comprising:

exhausting a gas from a tank that contains a processing liquid, the gas including a hazardous vapor of the processing liquid;

detecting a rate at which gas is exhausted from the tank;

determining if the detected rate is below a predetermined rate; and diluting the processing fluid contained by the tank with a diluting fluid if the detected rate is below the predetermined rate.

9. The method of claim 8 wherein diluting the processing fluid comprises cooling the processing fluid.

10. The method of claim 8 wherein detecting a rate comprises detecting a flow rate of gas in an exhaust system coupled to the tank.

11. The method of claim 8 wherein detecting a rate comprises detecting a pressure of gas in an exhaust system coupled to the tank.

12. The method of claim 8 wherein the diluting fluid is a fluid adapted to cool the processing fluid.

13. The method of claim 8 wherein the diluting fluid is de-ionized water.

14. A computer program product:

a medium readable by a computer, the computer readable medium having computer program code adapted to:

employ a sensor to detect a rate at which gas is exhausted from a tank, the gas including a hazardous vapor of a processing fluid contained by the tank;

determine if the detected rate is below a predetermined rate; and direct a fluid supply mechanism to dilute the processing fluid with diluting fluid if the detected rate is below the predetermined rate.

* * * * *